(12) United States Patent
Kang et al.

(10) Patent No.: US 11,671,287 B2
(45) Date of Patent: Jun. 6, 2023

(54) INTERCONNECT MODULE, UFS SYSTEM INCLUDING THE SAME, AND METHOD OF OPERATING THE UFS SYSTEM

(71) Applicant: SAMSUNG ELECTRONICS CO., LTD., Suwon-si (KR)

(72) Inventors: Youngsan Kang, Yongin-si (KR); Byungyo Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 17/511,186

(22) Filed: Oct. 26, 2021

(65) Prior Publication Data

US 2022/0158877 A1 May 19, 2022

(30) Foreign Application Priority Data

Nov. 13, 2020 (KR) .................. 10-2020-0152284

(51) Int. Cl.
*H04L 25/03* (2006.01)
*H04L 25/06* (2006.01)
*H04L 25/02* (2006.01)

(52) U.S. Cl.
CPC ...... *H04L 25/03878* (2013.01); *H04L 25/028* (2013.01); *H04L 25/0292* (2013.01); *H04L 25/03254* (2013.01); *H04L 25/062* (2013.01)

(58) Field of Classification Search
CPC ............. H04L 25/03878; H04L 25/028; H04L 25/0292; H04L 25/03254; H04L 25/062

USPC ......................................................... 375/229
See application file for complete search history.

(56) References Cited

U.S. PATENT DOCUMENTS

| | | |
|---|---|---|
| 8,902,964 B2 | 12/2014 | Aguilar-Arreola et al. |
| 9,020,418 B2 | 4/2015 | Card et al. |
| 10,050,623 B2 | 8/2018 | Xiao et al. |
| 2018/0137896 A1* | 5/2018 | Shin ..................... G11C 7/1003 |
| 2018/0285227 A1 | 10/2018 | Sharma et al. |
| 2019/0068397 A1 | 2/2019 | Chen |
| 2021/0200700 A1* | 7/2021 | Tanpairoj ................ G06F 13/24 |

FOREIGN PATENT DOCUMENTS

| | | |
|---|---|---|
| JP | 5024969 B2 | 9/2012 |
| KR | 10-1817258 B1 | 1/2018 |

\* cited by examiner

*Primary Examiner* — Leila Malek
(74) *Attorney, Agent, or Firm* — Sughrue Mion, PLLC

(57) ABSTRACT

An interconnect module device is provided. The interconnect module device includes a line control command (LCC) detecting circuit configured to identify an LCC signal; an equalizer control circuit configured to generate a control signal based on the LCC signal; a receiving equalizer configured to perform receiving equalization on a first signal received from a first universal flash storage (UFS) device based on the control signal to generate a second signal; and a transmitting equalizer configured to perform transmitting equalization on the second signal to generate a third signal based on the control signal, and transmit the third signal to a second UFS device.

20 Claims, 11 Drawing Sheets

FIG. 8A

| | Rx CHANNEL QUALITY | | | | |
|---|---|---|---|---|---|
| | 5 | 4 | 3 | 2 | 1 |
| CTLE | SINGLE | SINGLE | MULTIPLE (2 STAGE) | MULTIPLE (2 STAGE) | MULTIPLE (3 STAGE) |
| CTLE ADAPTATION | × | × | ○ | ○ | ○ |
| Rx FIR | SINGLE | SINGLE | SINGLE | MULTIPLE (2 TAPS) | MULTIPLE (2 to 3 TAPS) |

FIG. 8B

| | Tx CHANNEL QUALITY | | | | |
|---|---|---|---|---|---|
| | 5 | 4 | 3 | 2 | 1 |
| 3-TAP FIR FILTER SETTING | POST-CURSOR(-1.5dB) | POST-CURSOR(-3dB) | POST-CURSOR(-1.5dB) PRE-CURSOR(1.5dB) | POST-CURSOR(-3dB) PRE-CURSOR(1.5dB) | POST-CURSOR(-3dB) PRE-CURSOR(3dB) |

INTERCONNECT MODULE, UFS SYSTEM INCLUDING THE SAME, AND METHOD OF OPERATING THE UFS SYSTEM

CROSS-REFERENCE TO RELATED APPLICATION

This application claims priority from Korean Patent Application No. 10-2020-0152284, filed on Nov. 13, 2020 in the Korean Intellectual Property Office, the disclosure of which is incorporated by reference herein in its entirety.

BACKGROUND

Methods, apparatuses and systems consistent with example embodiments relate to an interconnect module, and more particularly, to an interconnect module interconnecting a universal flash storage (UFS) host and a UFS device, a UFS system including the same, and a method of operating the UFS system.

A storage system may include a host and a storage device. The host and the storage device may be connected to each other through various standard interfaces, such as universal flash storage (UFS), serial ATA (SATA), small computer small interface (SCSI), serial attached SCSI (SAS), embedded MMC (eMMC), etc.

As electronic devices employ various form factors, a physical distance between a UFS host and a UFS device may increase. However, standard specifications may have limited physical distance requirements. For example, the M-PHY standard specification shows that a UFS channel is optimized for short interconnects within 10 cm. To overcome the limited physical distance within 10 cm, an optical media converter (OMC) may be used. However, to perform long-distance communication by using an OMC, an optical transmitter and an optical receiver need to be separately provided at the transmitting/receiving terminals of a UFS host and a UFS device, and it is necessary to transmit and receive signals through a plastic optical fiber (POF) medium. Because the POF medium is different from that of an existing galvanic lane that transmits electrical signals, a separate test process is needed to ensure correct transmitting/receiving of signals, and separate test resources need to be allocated therefor. As a result, the overall performance may be deteriorated.

SUMMARY

Example embodiments provide an interconnect module for extending a physical distance between a universal flash storage (UFS) device and a UFS host in a UFS system, a UFS system including the same, and a method of operating the UFS system.

According to an aspect of an example embodiment, an interconnect module device includes: a line control command (LCC) detecting circuit configured to identify an LCC signal; an equalizer control circuit configured to generate a control signal based on the LCC signal; a receiving equalizer configured to perform receiving equalization on a first signal received from a first universal flash storage (UFS) device based on the control signal to generate a second signal; and a transmitting equalizer configured to perform transmitting equalization on the second signal to generate a third signal based on the control signal, and transmit the third signal to a second UFS device.

According to an aspect of an example embodiment, a UFS system includes: a UFS host; a UFS device; and an interconnect module device configured to provide a downstream UFS lane and an upstream UFS lane interconnecting the UFS host and the UFS device. The UFS host is configured to transmit a first signal and a line control command (LCC) signal to the UFS device through the downstream UFS lane, the UFS device is configured to transmit a second signal and the LCC signal to the UFS host through the upstream UFS lane, and a physical distance between the UFS host and the UFS device is equal to or greater than 10 cm.

According to an aspect of an example embodiment, a method of operating a UFS system is provided. The UFS system includes a UFS host, a UFS device, a first UFS lane interconnecting the UFS host and the UFS device via a first interconnect module device, and a second UFS lane interconnecting the UFS host and the UFS device via a second interconnect module device. The method includes: transmitting, by the UFS host, a first signal indicating a change of a power mode and a line control command (LCC) signal to the first interconnect module device; identifying, by the first interconnect module device, a first data rate based on the LCC signal and controlling a first signal delay value for at least one first equalizer included in the first interconnect module device according to the first data rate; transmitting, by the UFS device, a second signal indicating completion of a power mode change according to the first signal and the LCC signal, to the second interconnect module device; and identifying, by the second interconnect module device, a second data rate based on the LCC signal and controlling a second signal delay value for at least one second equalizer included in the second interconnect module device according to the second data rate. A length of an electrical connection between the UFS host and the UFS device is equal to or greater than 10 cm.

BRIEF DESCRIPTION OF THE DRAWINGS

The above, and other aspects, features and advantages will be more clearly understood from the following detailed description of example embodiments, taken in conjunction with the accompanying drawings in which:

FIG. 8A is a table showing an example of setting a receiving equalizer according to receiving channel quality according to an example embodiment;

FIG. 8B is a table showing an example of setting a transmitting equalizer according to transmitting channel quality according to an example embodiment;

DETAILED DESCRIPTION

Figure 1:
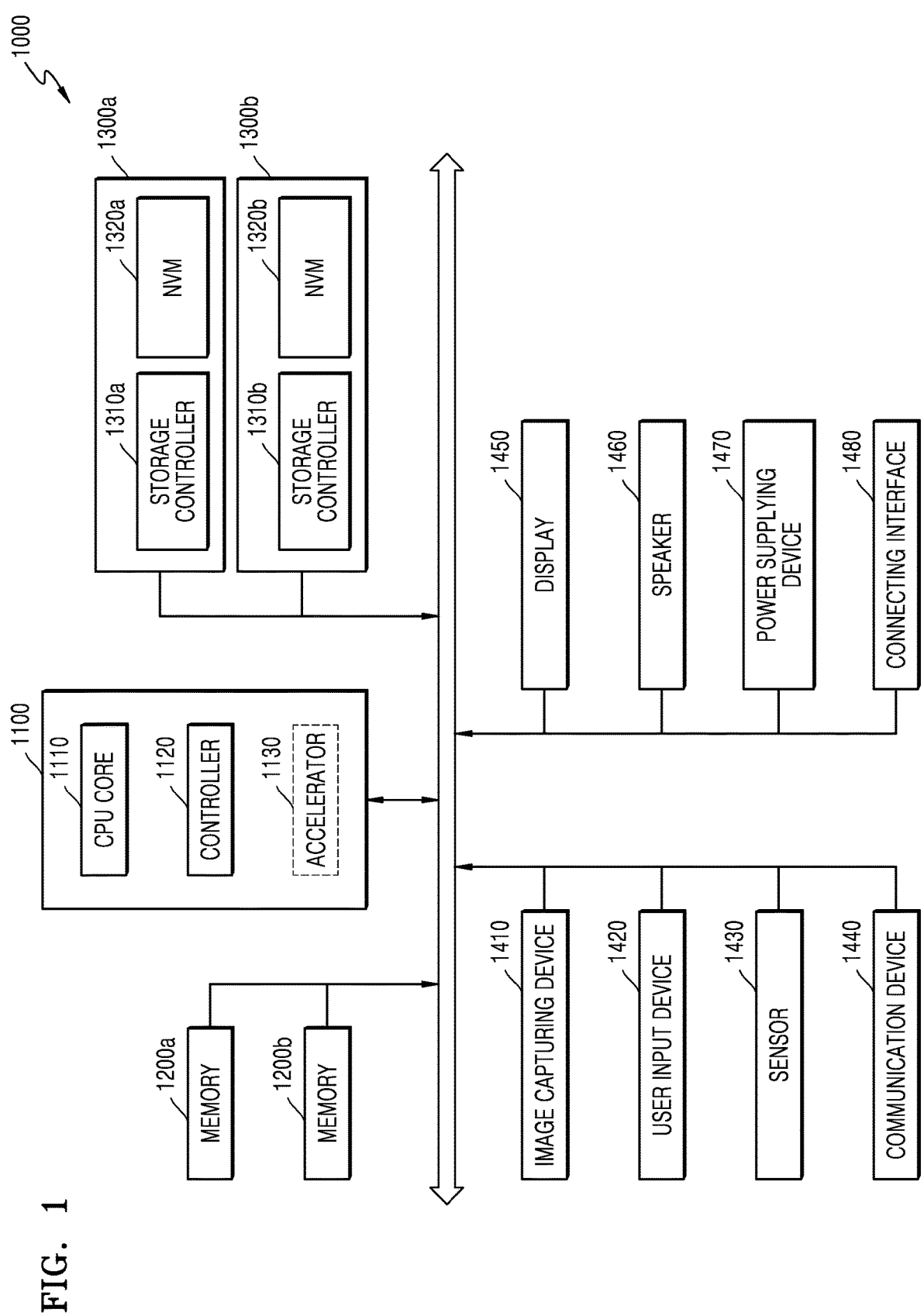
FIG. 1 is a diagram showing a system to which a storage device according to an example embodiment is applied.

FIG. 1 is a diagram showing a system to which a storage device according to an example embodiment is applied.

Referring to FIG. 1, a system 1000 of FIG. 1 may be a mobile system such as a mobile phone, a smartphone, a tablet personal computer (PC), a wearable device, a healthcare device, or an Internet of Things (IoT) device. However, the system 1000 of FIG. 1 is not necessarily limited to a mobile system and may include a personal computer, a laptop computer, a server, a media player, or automobile equipment such as a navigation device.

Referring to FIG. 1, the system 1000 may include a main processor 1100, memories 1200a and 1200b, and storage devices 1300a and 1300b and may additionally include at least one of an image capturing device 1410, a user input device 1420, a sensor 1430, a communication device 1440, a display 1450, a speaker 1460, a power supplying device 1470, and a connecting interface 1480.

The main processor 1100 may control the overall operation of the system 1000, and more particularly, the operations of other components constituting the system 1000. The main processor 1100 may be implemented with a general-purpose processor, a dedicated processor, or an application processor.

The main processor 1100 may include one or more CPU cores 1110 and may further include a controller 1120 for controlling the memories 1200a and 1200b and/or the storage devices 1300a and 1300b. According to example embodiments, the main processor 1100 may further include an accelerator 1130, which is a dedicated circuit for a high-speed data operation such as an artificial intelligence (AI) data operation. The accelerator block 1130 may include a graphics processing unit (GPU), a neural processing unit (NPU) and/or a data processing unit (DPU), and may also be implemented as a separate chip physically independent from the other components of the main processor 1100.

The memories 1200a and 1200b may be used as the main memory device of the system 1000 and may include volatile memories such as static random access memories (SRAMs) and/or dynamic RAMs (DRAMs). However, example embodiments are not limited thereto, and the memories 1200a and 1200b may also include non-volatile memories such as flash memories, phase change RAMs (PRAMs), and/or resistive RAMs (RRAMs). The memories 1200a and 1200b may be implemented in the same package as the main processor 1100.

The storage devices 1300a and 1300b may function as non-volatile storage devices that store data regardless of whether power is supplied thereto, and may have a relatively large storage capacity as compared to the memories 1200a and 1200b. The storage devices 1300a and 1300b may include storage controllers 1310a and 1310b and non-volatile memories (NVMs) 1320a and 1320b that store data under the control of the storage controllers 1310a and 1310b. The NVMs 1320a and 1320b may include NAND flash memories, but may also include other types of non-volatile memories such as PRAMs and/or RRAMs.

The storage devices 1300a and 1300b may be included in the system 1000 while being physically separated from the main processor 1100 or may be implemented in the same package as the main processor 1100. Also, the storage devices 1300a and 1300b be implemented in a form such as memory cards, and thus, the storage devices 1300a and 1300b may be detachably coupled to the other components of the system 1000 through an interface such as a connecting interface 1480 to be described later. The storage devices 1300a and 1300b may be devices to which a standard protocol such as universal flash storage (UFS) is applied.

The image capturing device 1410 may capture a still image or a moving picture and may include a camera, a camcorder, and/or a webcam. The user input device 1420 may receive various types of data input from a user of the system 1000 and may include a touch pad, a keypad, a keyboard, a mouse, and/or a microphone.

The sensor 1430 may sense various types of physical quantities that may be obtained from outside the system 1000 and transform sensed physical quantities into electrical signals. The sensor 1430 may include a temperature sensor, a pressure sensor, an illuminance sensor, a positional sensor, an acceleration sensor, a biosensor, and/or a gyroscope.

The communication device 1440 may transmit and receive signals to and from other devices outside the system 1000 according to various communication protocols. The communication device 1440 may include an antenna, a transceiver, and/or a modem.

The display 1450 and the speaker 1460 may function as output devices that output visual and auditory information to a user of the system 1000, respectively.

The power supplying device 1470 may appropriately convert power supplied from a battery embedded to the system 1000 and/or power supplied from an external power source and supply converted power to the components of the system 1000.

The connecting interface 1480 may provide a connection between the system 1000 and an external device, which is connected to the system 1000 and is capable of exchanging data with the system 1000. The connecting interface 1480 may be implemented according to various interface protocols such as an advanced technology Attachment (ATA) interface), a serial ATA (SATA) interface, an external SATA (e-SATA) interface, a small computer small interface (SCSI), a serial attached SCSI (SAS), a peripheral component interconnection (PCI) interface, A PCI express (PCIe) interface, an NVM express (NVMe) interface, an IEEE 1394 interface, a universal serial bus (USB) interface, a secure digital (SD) card interface, a multi-media card (MMC) interface, an embedded multi-media card (eMMC) interface, a universal flash storage (UFS) interface, an embedded universal flash storage (eUFS) interface, a compact flash (CF) card interface, etc.

Figure 2:
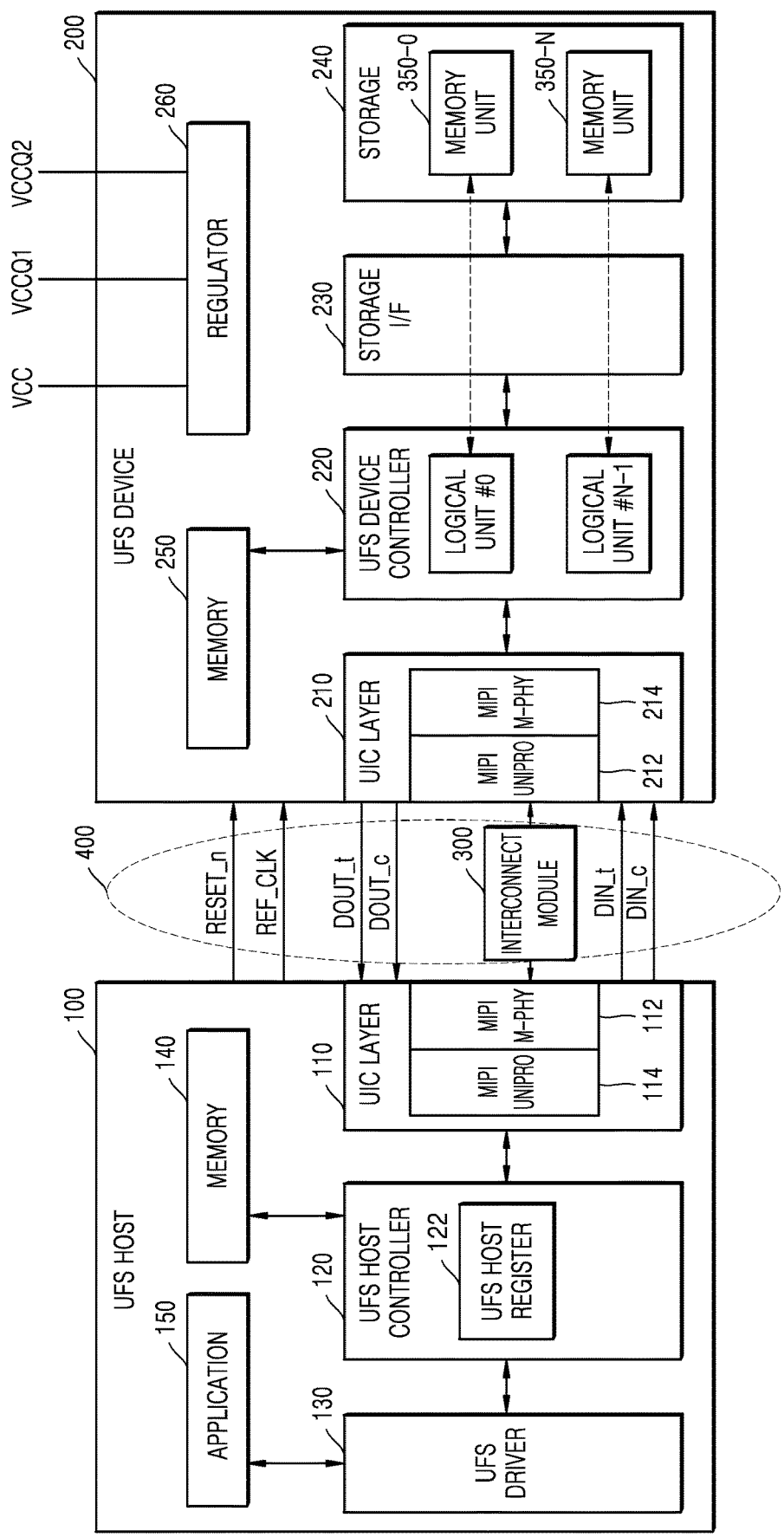
FIG. 2 is a diagram showing a universal flash storage (UFS) system according to an example embodiment.

FIG. 2 is a diagram for describing a UFS system according to an example embodiment.

A UFS system is a system conforming to the UFS standard announced by the Joint Electron Device Engineering Council (JEDEC) and may include a UFS host 100, a UFS device 200, and a UFS interface 400. The descriptions of the system of FIG. 1 given above may also be applied to the UFS system 10 of FIG. 2 within a range that does not conflict with descriptions of FIG. 2 below.

Referring to FIG. 2, the UFS host 100 and the UFS device 200 may be interconnected through the UFS interface 400.

When the main processor 1100 of FIG. 1 is an application processor, the UFS host 100 may be implemented as a part of the corresponding application processor.

The UFS host 100 may include an application 150, a UFS driver 130, a UFS host controller 120, a memory 140, and a UFS interconnect (UIC) layer 110. In this case, the UFS host controller 120 may correspond to the controller 1120 of the main processor 1100 of FIG. 1, whereas the memory 140 may correspond to the memories 1200a and 1200b and the storage devices 1300a and 1300b of the main processor 1100 of FIG. 1.

The UFS device 200 may include a UFS device controller 220, a storage 240, a storage interface 230, a memory 250, a UIC layer 210 and a regulator 260. The storage 240 may include a plurality of non-volatile memory units 350-0 through 350-N (N being a positive integer).

The application 150 may refer to a program that communicates with the UFS device 200 to use functions of the UFS device 200. The application 150 may transmit an input/output request (IOR) to the UFS driver 130 for input/output to/from the UFS device 200. The IOR may refer to, but is not limited to, a request to read data, a request to write data, and/or a request to discard data.

The UFS driver 130 may manage the UFS host controller 120 through a UFS-host controller interface (HCI). The UFS driver 130 may convert an IOR generated by the application 150 into a UFS command in accordance with the UFS standard and transmit a UFS command to the UFS host controller 120. One IOR may be transformed into a plurality of UFS commands. For example, a UFS command may be a command in accordance with the SCSI standard or a command in accordance with the UFS standard.

The UFS host controller 120 may transmit a UFS command from conversion by the UFS driver 130 to the UIC layer 210 of the UFS device 200 through the UIC layer 110 of the UFS host 100 and the UFS interface 400. During the process, a UFS host register 122 of the UFS host controller 120 may serve as a command queue (CQ).

The UIC layer 110 of the UFS host 100 may include a mobile industry processor interface (MIPI) UniPro 114 and an MIPI M-PHY 112, and the UIC layer 210 of the UFS device 200 may also include an MIPI M-PHY 212 and an MIPI UniPro 214.

The UFS interface 400 may include a line for transmitting a reference clock signal REF_CLK, a line for transmitting a hardware reset signal RESET_n for the UFS device 200, a pair of lines for transmitting a differential input signal pair DIN_t and DIN_c, and a pair of lines for transmitting a differential output signal pair DOUT_t and DOUT_c.

A frequency value of the reference clock signal REF_CLK provided from the UFS host 100 to the UFS device 200 may be, for example, 19.2 MHz, 26 MHz, 38.4 MHz, or 52 MHz. However, example embodiments are not limited thereto, and the reference clock signal REF_CLK may have another frequency value.

The UFS host 100 may change the frequency value of the reference clock signal REF_CLK during an operation, for example, while data transmitting/receiving is being performed between the UFS host 100 and the UFS device 200. The UFS device 200 may generate clock signals of various frequencies from the reference clock signal REF_CLK provided from the UFS host 100 by using a phase-locked loop (PLL) or the like.

The UFS interface 400 may support multiple lanes, and each lane may be implemented as a differential pair. For example, the UFS interface 400 may include at least one receive lane and at least one transmit lane. A pair of lines for transmitting a differential input signal pair DIN_t and DIN_c may correspond to the receive lane, and a pair of lines for transmitting the differential output signal pair DOUT_t and DOUT_c may correspond to the transmit lane.

At least one receive lane and at least one transmit lane may transmit data through serial communication, and full-duplex communication may be performed between the UFS host 100 and the UFS device 200 based on a structure in which the at least one receive lane and the at least one transmit lane are separated from each other.

When a command from the UFS host 100 is input to the UFS device 200 through the UIC layer 210, the UFS device controller 220 may perform an operation according to an input command and, when the operation is completed, transmit a completion response to the UFS host 100.

For example, when the input command is a write command, the UFS device controller 220 may temporarily store write data provided from the UFS host 100 in the memory 250. Also, the UFS device controller 220 may store the write data temporarily stored in the memory 250 at a selected location of an NVM block through the storage interface 230.

The UFS device controller 220 may manage the storage 240 through a logical unit (LU), which is a unit for storing logical data. The number of LUs may be 8, but is not limited thereto.

The UFS device controller 220 may include a flash translation layer (FTL), and a logical data address (e.g., a logical block address (LBA)) transmitted from the UFS host 100 using an FTL may be transformed into a data address (e.g., a physical block address (PBA)). In the UFS system 10, the minimum size of a logical block for storing user data may be set to 4 Kbytes.

The UFS host 100 may store commands to be transmitted to the UFS device 200 in the UFS host register 122, which may function as a CQ, in an order and transmit commands to the UFS device 200 in the above-stated order. At this time, even when a previously transmitted command is still being processed by the UFS device 200 (that is, even before receiving a notification that the previously transmitted command is processed by the UFS device 200), the UFS host 100 may transmit a next command waiting in the CQ to the UFS device 200, and thus, the UFS device 200 may also receive a next command from the UFS host 100 even while a previously transmitted command is being processed. A queue depth of commands that may be stored in such a CQ may be 32, for example. Also, a CQ may be implemented as a circular queue that indicates the start and the end of a command sequence stored in the queue through a head pointer and a tail pointer.

A plurality of memory units 350-0 to 350-N may each include a memory cell array and a control circuit for controlling the operation of the memory cell array. The memory cell array may include a two-dimensional memory cell array or a three-dimensional memory cell array. A memory cell array includes a plurality of memory cells, and the memory cells may each be a single level cell (SLC) that stores one bit of data. However, example embodiments are not limited thereto, and the memory cells may each be a cell that stores two or more bits of data, e.g., a multilevel cell (MLC), a triple level cell (TLC), a quadruple level cell (QLC). A three-dimensional memory cell array may include vertical NAND strings vertically oriented, such that at least one memory cell is on top of another memory cell.

Power voltages such as VCC, VCCQ, and VCCQ2 may be input to the UFS device 200. VCC is a main power voltage for the UFS device 200 and may have a value, for example, from about 2.4 V to about 3.6 V. VCCQ is a power voltage for supplying a low range voltage mainly for the UFS device controller 220 and may have a value, for example, from about 1.14 V to about 1.26 V. VCCQ2 is a power voltage for supplying a voltage in a range lower than VCC but higher than VCCQ, is mainly for input/output interfaces such as an MIPI M-PHY, and may have a value, for example, from about 1.7 V to about 1.95 V. The power voltages may be supplied for the components of the UFS device 200 via a regulator 260.

According to various example embodiments, the UFS interface 400 may further include an interconnect module 300. The interconnect module 300 may purify and amplify a transmitting signal and transmit a result thereof to a receiving end. The interconnect module 300 may purify a transmitting signal through a receiving equalizer, thereby removing noise and enhancing eye characteristics of the transmitting signal in an eye diagram. The interconnect module 300 may improve the frequency characteristics of a purified transmitting signal to be optimized for a transmitting channel through a transmitting equalizer and transmit the purified transmitting signal to a receiving end. Therefore, the interconnect module 300 may allow for a physical distance between the UFS host 100 and the UFS device 200 to be increased. For example, a transmitting UFS may be connected to a receiving UFS via a plurality of interconnect modules. Each of the plurality of interconnect modules may serially connected. In one example embodiment, the transmitting UFS may be connected to the receiving UFS via a first interconnect module and a second interconnect module. The short interconnect distance of about 10 cm specified in the M-PHY standard needs to be satisfied between a transmitting UFS and the first interconnect module, between the first interconnect module and the second interconnect module next thereto, and between the second interconnect module and the receiving UFS. Therefore, when connecting the UFS host 100 and the UFS device 200 beyond the length specified in the M-PHY standard, a UFS channel may be formed by providing at least one interconnect module therebetween. Detailed descriptions of the interconnect module 300 will be described below.

Figure 3A:
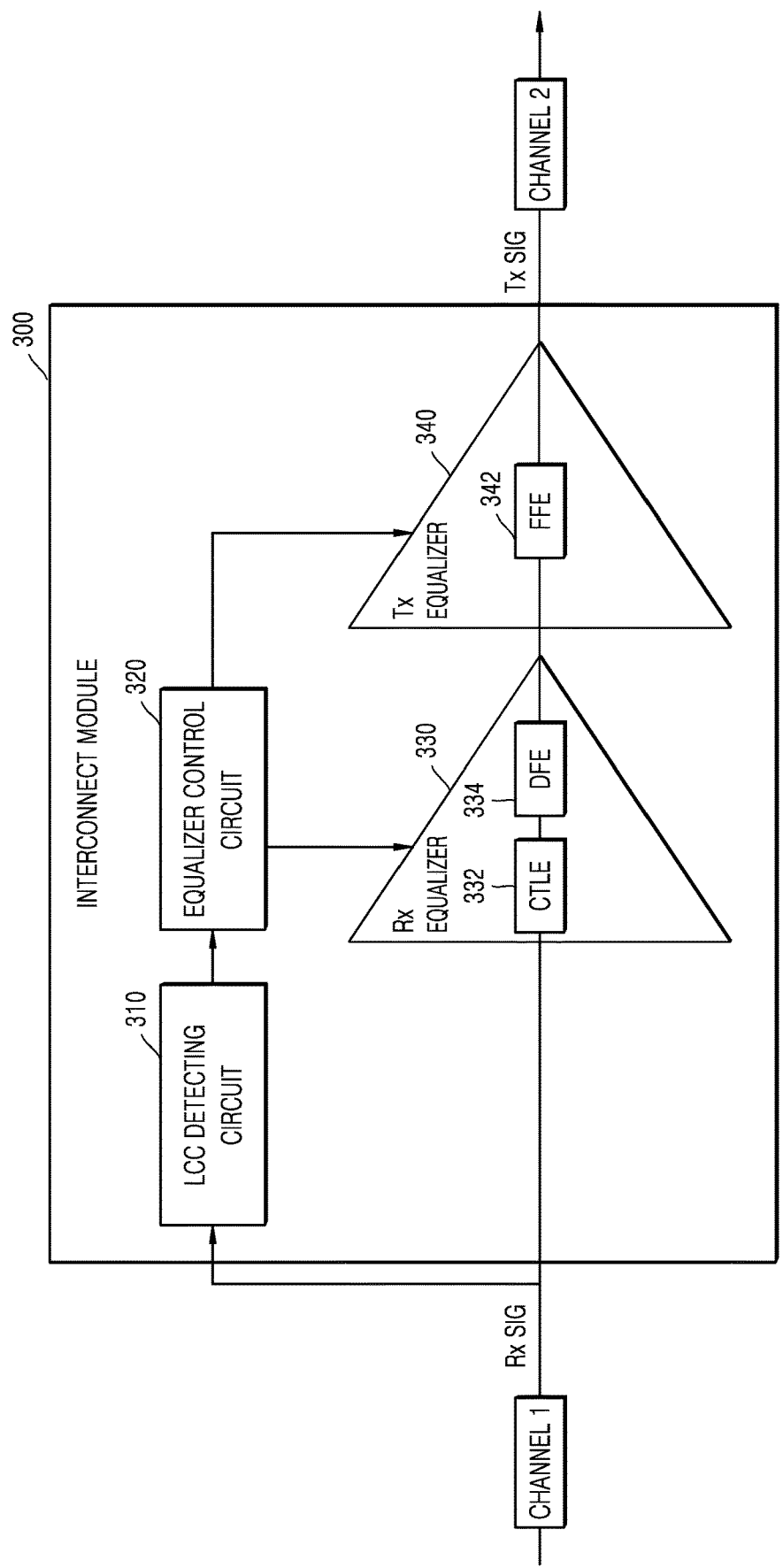
FIG. 3A is a block diagram of an interconnect module according to an example embodiment.

FIG. 3A is a block diagram of an interconnect module according to an example embodiment.

Referring to FIG. 3A, the interconnect module 300 may include a line control command (LCC) detecting circuit 310, an equalizer control circuit 320, a receiving equalizer 330, and a transmitting equalizer 340.

The LCC detecting circuit 310 may detect an LCC signal. The LCC signal may refer to a signal for controlling a UFS transmitting line between the UFS host 100 and the UFS device 200. For example, the LCC signal may include 10 bits, wherein five bits from d0 to d4 may correspond to data bits, and five bits from d5 to d9 may be parity bits for cyclical redundancy check (CRC).

According to various example embodiments, the LCC detecting circuit 310 may detect the LCC signal based on any one or any combination of a pulse width and an amplitude. According to various example embodiments, an LCC signal may have an amplitude or a pulse width different from that of a signal (e.g., LINE-INIT, PACP_PWR_req, etc.) preceding the LCC signal.

Figure 3B:
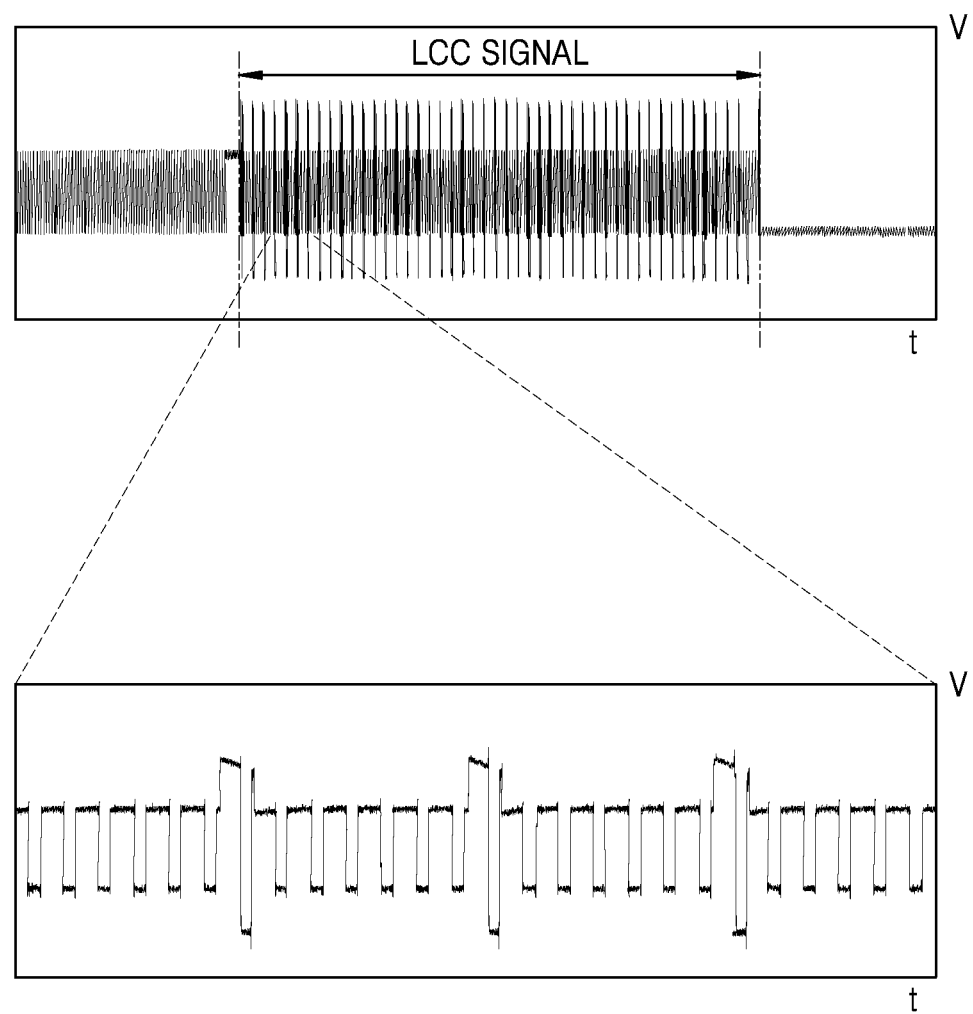
FIG. 3B is a diagram showing an example of a waveform of a line control command (LCC) signal.

Referring to FIG. 3B, an LCC signal may have an amplitude different from that of a preceding analog signal. For example, when a preceding analog signal is a LINE-INIT signal, it may be seen that the amplitude of the LINE-INIT signal corresponds to 400 mV, whereas the amplitude of the LCC signal corresponds to 1 V. In other words, the LCC detecting circuit 310 may monitor a received signal Rx sig from a receiving channel (Channel 1 of FIG. 3A) and, when a signal having a pre-defined amplitude value (e.g., 1 V) is detected, may determine that an LCC signal is received.

Referring to FIG. 3B, an LCC signal may have a pulse width different from that of a preceding analog signal. For example, it may be seen that the preceding analog signal has a pulse width in units of [ps], whereas the pulse width corresponding to the LCC signal is about 0.001 ms. Therefore, the LCC detecting circuit 310 may determine that an LCC signal is received in response to detection of a signal having a pre-defined pulse width.

According to various example embodiments, the LCC detecting circuit 310 may set a pulse width as a first priority and an amplitude as a second priority, and may determine detection of an LCC signal based on the first priority and the second priority. For example, attenuation of the amplitude of a received analog signal varies according to a length of a UFS channel through which the analog signal is received, but the pulse width may be maintained constant. Therefore, the LCC detecting circuit 310 may determine the pulse width as the first priority and, when a signal having a pulse width of a predefined value is detected, may determine detection of an LCC signal immediately or, based on the second priority, by further determining whether the amplitude of a received analog signal exceeds a certain magnitude.

In the above-described example embodiment, it has been described that the LCC detecting circuit 310 determines detection of an LCC signal based on an amplitude and/or a pulse width of a received analog signal, but example embodiments are not limited thereto. According to various example embodiments, the LCC detecting circuit 310 may determine detection of an LCC signal based on at least one analog signal characteristic different from that of a preceding or following signal.

The equalizer control circuit 320 may generate a control signal for controlling the receiving equalizer 330 and the transmitting equalizer 340. The equalizer control circuit 320 may receive LCC detection information from the LCC detecting circuit 310 and, based on the same, may identify a data transmitting rate in a changed power mode. The equalizer control circuit 320 may identify a data transmission rate of a received LCC signal based on Table 1 below.

TABLE 1

| d0 | d1 | LCC-Category | d2 | d3 | d4 | Command | d5 p1 | d6 p2 | d7 p3 | d8 p4 | d9 p5 |
|---|---|---|---|---|---|---|---|---|---|---|---|
| 1 | 1 | HS-MODE | 0 | 0 | 0 | HS-G1A | 1 | 0 | 0 | 1 | 1 |
|   |   |   | 0 | 0 | 1 | HS-G2A | 0 | 0 | 0 | 0 | 0 |
|   |   |   | 0 | 1 | 0 | HS-G3A | 0 | 1 | 1 | 1 | 1 |
|   |   |   | 0 | 1 | 1 | HS-G4A | 1 | 1 | 1 | 0 | 0 |
|   |   |   | 1 | 0 | 0 | HS-G1B | 1 | 1 | 1 | 1 | 0 |
|   |   |   | 1 | 0 | 1 | HS-G2B | 0 | 1 | 1 | 0 | 1 |
|   |   |   | 1 | 1 | 0 | HS-G3B | 0 | 0 | 0 | 1 | 0 |
|   |   |   | 1 | 1 | 1 | HS-G4B | 1 | 0 | 0 | 0 | 1 |

According to an example embodiment, the equalizer control circuit 320 may identify a power mode based on bits d0 to d4 of an LCC signal. For example, when the bits d0 to d4 are 11011, the power mode may correspond to HS-G4A. The equalizer control circuit 320 may determine a data transmission rate based on an identified power mode and Table 2 below.

TABLE 2

| High-Speed GEARs | RATE A-series (Mbps) | RATE B-series (Mbps) |
|---|---|---|
| HS-G1 (A/B) | 1248 | 1457.6 |
| HS-G2 (A/B) | 2496 | 2915.2 |
| HS-G3 (A/B) | 4992 | 5830.4 |
| HS-G4 (A/B) | 9984 | 11660.8 |

The equalizer control circuit 320 may generate a control signal based on the identified operation rate, and may transmit the generated control signal to the receiving equalizer 330 and the transmitting equalizer 340. The control signal may include setting information to be changed, such that the receiving equalizer 330 and the transmitting equalizer 340 support an identified operation rate. The control signal may include information regarding a delay value of a filter tap. For example, when the power mode is HS-G1A, the delay value indicated by the control signal may correspond to an appropriate delay value for processing symbols transmitted at a data rate of 1248 Mbps.

The receiving equalizer 330 may improve the quality of a received signal Rx SIG. According to various example embodiments, the receiving equalizer 330 may include a continuous time linear equalizer (CTLE) 332 and a decision feedback equalizer (DFE) 334. The CTLE 332 may amplify a high frequency component and reduce distortion of a low frequency component by summing two signals passed through a high frequency boosting gain path including a high pass filter and a single gain path. The DFE 334 may be a non-linear equalizer and may remove inter symbol interference (ISI) by using a previously determined value.

The transmitting equalizer 340 may include a feed forward equalizer (FFE) 342. The FFE 342 may apply an appropriate weight to signals and sum the signals to generate several delayed signals. In an example embodiment, the FFE 342 may perform equalization through a pre-cursor and a post-cursor based on a multi-tab filter and a multi-tap coefficient. The transmitting equalizer 340 may transmit a purified signal Tx SIG to a receiving UFS through a transmitting channel (Channel 2 of FIG. 3A).

Figure 4A:
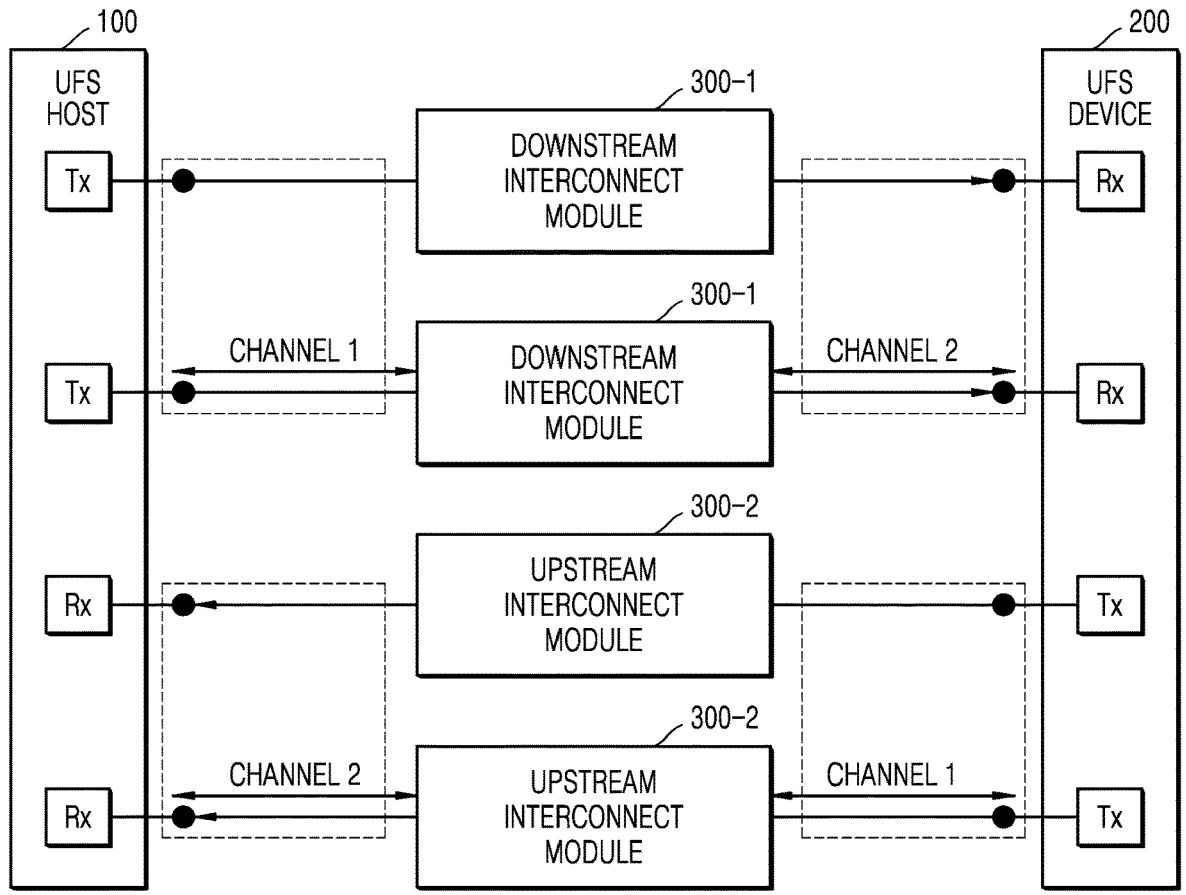
FIG. 4A is a diagram showing an example of a UFS system according to an example embodiment.

FIG. 4A is a diagram showing an example of a UFS system according to an example embodiment.

Referring to FIG. 4A, the UFS host 100 may be connected to the UFS device 200 through four UFS lanes. According to an example embodiment, two of the four UFS lanes may correspond to downstream UFS lanes, and the other two may correspond to upstream UFS lanes.

According to various example embodiments, the UFS lanes may each include an interconnect module. For example, a downstream UFS lane may include a downstream interconnect module 300-1, and an upstream UFS lane may include an upstream interconnect module 300-2.

Figure 4B:
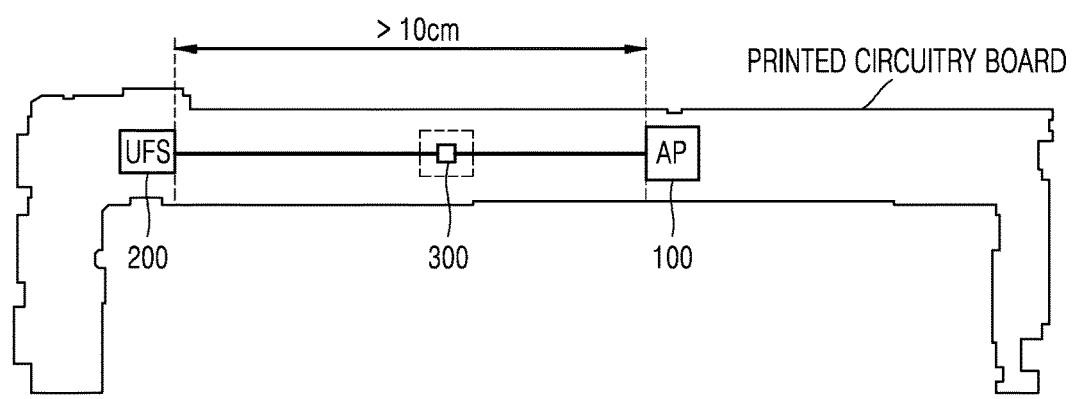
FIG. 4B is a diagram showing an implementation example of a UFS system according to an example embodiment.

According to an example embodiment, each of the receiving channel (Channel 1) and the transmitting channel (Channel 2) may be referred to based on the interconnect module 300. For example, in the case of the downstream interconnect module 300-1, a signal may be received from the UFS host 100 and transmitted to the UFS device 200. Accordingly, the receiving channel (Channel 1) may refer to a section between the UFS host 100 and the downstream interconnect module 300-1, and the transmitting channel (Channel 2) may refer to a section between the downstream interconnect module 300-1 and the UFS device 200. Referring to FIG. 4B, the UFS host 100 may be implemented as an application processor, and the UFS device 200 may be implemented as a UFS storage device. The downstream interconnect module 300-1 and the upstream interconnect module 300-2 of FIG. 4A may be included in the interconnect module 300 of FIG. 4B. Referring to the standard specification for the M-PHY, it may be seen that a distance between the UFS host 100 and interconnect module 300 or between the UFS device 200 and the interconnect module 300 is optimized for a short interconnection of less than 10 cm. Previously, an optical media converter (OMC) needs to be used to implement a connection of 10 cm or longer as shown in FIG. 4B. However, by arranging the interconnect module 300 in the middle of a UFS lane the UFS host 100 and the UFS device 200 for repeating signals, a UFS connection of 10 cm or longer may be implemented.

Figure 5:
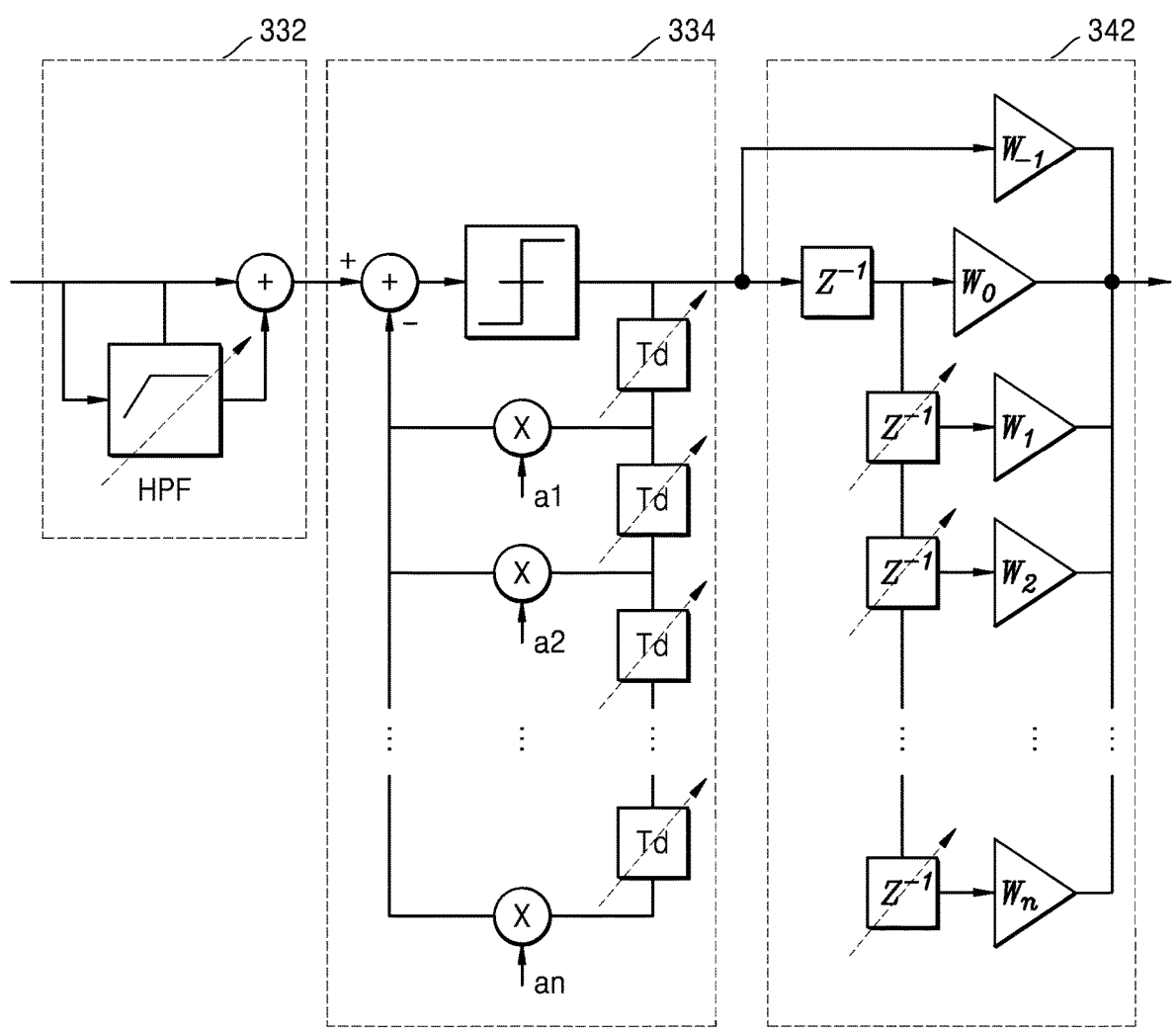
FIG. 5 is a circuit diagram of a transmitting equalizer and a receiving equalizer according to an example embodiment.

FIG. 5 is a circuit diagram of a transmitting equalizer and a receiving equalizer according to an example embodiment.

Referring to FIG. 5, the CTLE 332 may be implemented as a high pass filter (HPF). The DFE 334 may be implemented based on at least one tap filter and at least one tap coefficient.

The FFE 342 may perform pre-emphasis. The pre-emphasis may refer to intentional correction of a signal in advance in preparation for distortion occurring during a process of transmitting a signal. According to an example embodiment, the FFE 342 may de-emphasize and transmit a transmitting signal. The FFE 342 may be implemented as a finite impulse response (FIR) filter for the de-emphasis. The FFE 342 may de-emphasize and transmit a signal to improve a height and a margin of an eye diagram of the signal at a receiving end.

Figure 6:
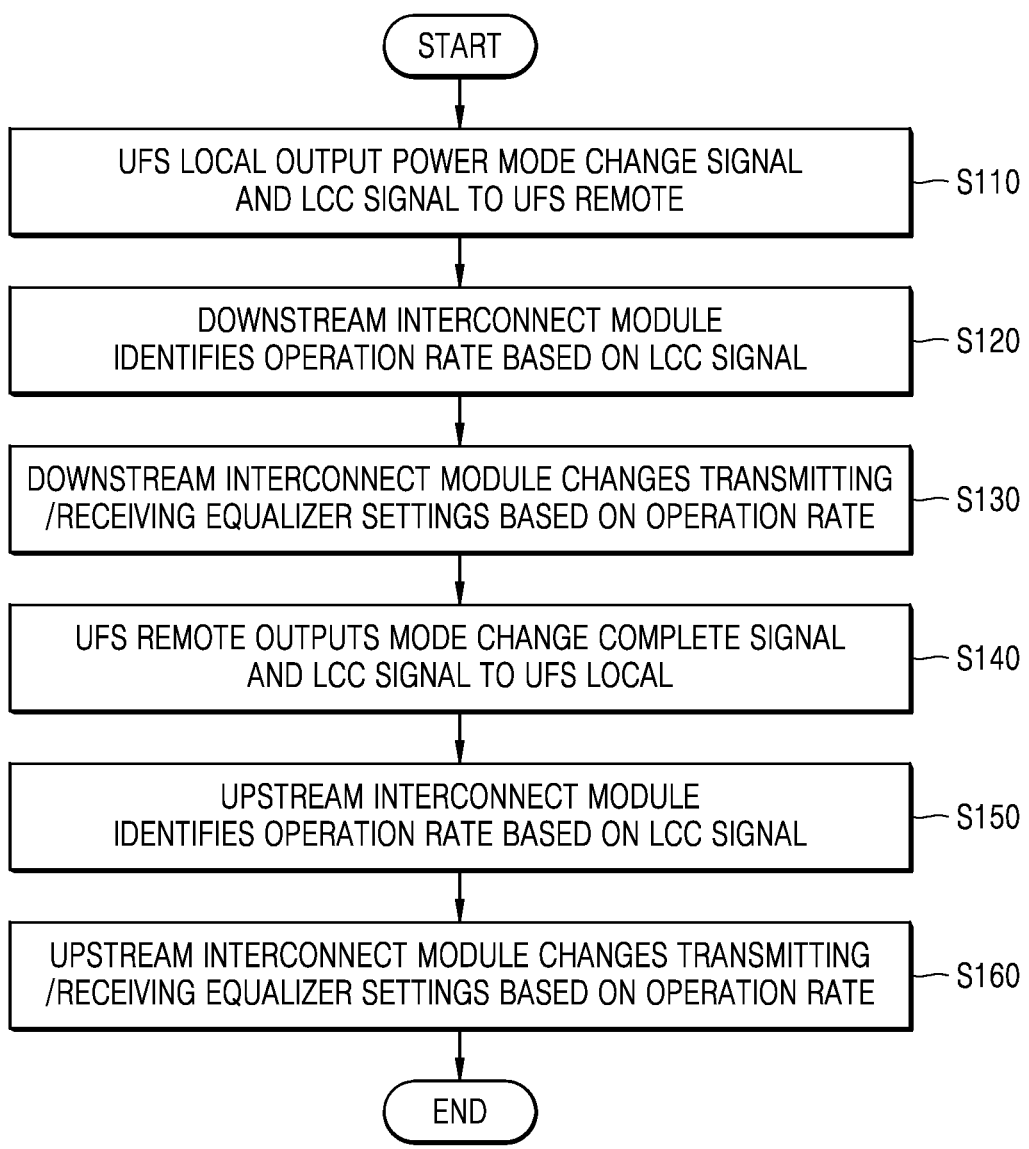
FIG. 6 is a flowchart of a method of operating a UFS system, according to an example embodiment.

FIG. 6 is a flowchart of a method of operating a UFS system, according to an example embodiment.

Referring to FIG. 6, in operation S110, a UFS local may output an LCC signal together with a power mode change signal to a UFS remote. Hereinafter, a side of the UFS system 1000 that first transmits a signal will be referred to as the UFS local, whereas a side that receives a transmitted signal will be referred to as the UFS remote. In operation S110, the UFS local may transmit a power mode change signal and an LCC signal to the UFS remote. For example, the UFS local corresponding to the UFS host 100 may decide to change a power mode. The UFS local may transmit a PACP_PWR_req signal to the UFS remote to notify the change of the power mode. UFS local may transmit an LCC signal together with the PACP_PWR_req signal. The LCC signal may include bits indicating a power mode to be changed to. For example, when the power mode to be changed to is HS-G3A, bits d0 to d4 of the LCC signal may have a value "01111".

In operation S120, the interconnect module 300 may identify an operation rate based on the LCC signal. The LCC detecting circuit 310 of the interconnect module 300 may monitor a received signal to identify receipt of an LCC signal. When an LCC signal is detected, the equalizer control circuit 320 may determine the power mode to be changed to by decoding the LCC signal. For example, in operation S110, the LCC signal may include an information bit "01111". The equalizer control circuit 320 may decode the LCC signal and identify a power mode mapped to the decoded bit. For example, based on the information bit "01111", the power mode HS-G3A may be identified. Therefore, the UFS local will change the power mode to HS-G3A.

In operation S130, the interconnect module 300 may change transceiving equalization settings of the transmitting equalizer 340 and the receiving equalizer 330, based on the operation rate. Here, the interconnect module 300 may correspond to one of the downstream interconnect modules 300-1 shown in FIG. 4A.

According to an example embodiment, when a currently operating power mode is HS-G1A and the power mode to be changed to is HS-G3A, the interconnect module 300 may transmit setting information for supporting a data transmission rate to be increased to the receiving equalizer 330 and the transmitting equalizer 340. The setting information may include time values for delaying signals in a filter tap of the DFE 334. When the power mode is changed from HS-G1A to HS-G3A, the data transmission rate is increased, and thus settings of the DFE 334 may be changed to support the data transmission rate of HS-G3A by reducing a delay of the filter tap.

In operation S140, the UFS remote may output an LCC signal to the UFS local together with a mode change complete signal. Previously, a UFS remote outputs only a mode change complete signal in response to a power mode change signal. However, a UFS remote according to various example embodiments may output a previously received LCC signal again. According to an example embodiment, the mode change complete signal may correspond to a PACP_PWR_cnf signal. This is because a module in which the settings of the transmitting equalizer 340 and the receiving equalizer 330 are changed in operation S130 only includes the downstream interconnect module 300-1. The UFS remote may notify the upstream interconnect module 300-2 that the power mode is changed by outputting the LCC signal together with the mode change complete signal.

In operation S150, the upstream interconnect module 300-2 may identify an operation rate based on the LCC signal and change the settings of the transmitting equalizer 340 and the receiving equalizer 330 in operation S160 based on an identified operation rate. Descriptions of operations S150 and S160 are identical to the descriptions of operations S120 and S130 and will be omitted.

In the above-described example embodiment, the UFS local and UFS remote may transmit information regarding a power mode to be changed to without using a new control signal format or a new reserved bit by transmitting an LCC signal in addition to a power mode change signal and a mode change complete signal, and the interconnect module 300 may change equalizer settings in response to the power mode to be changed to.

Figure 7:
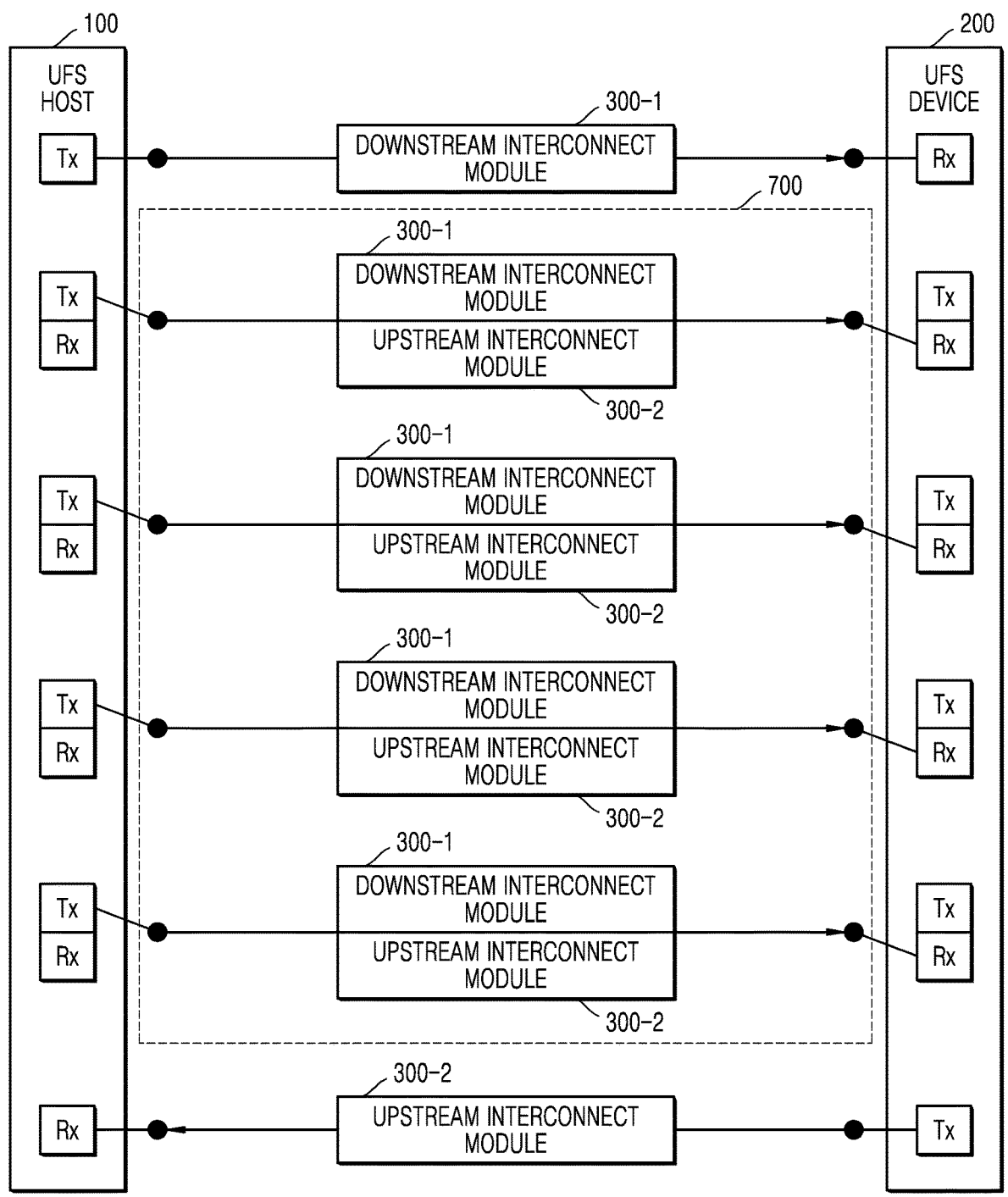
FIG. 7 is a diagram showing another example of a UFS system according to an example embodiment.

FIG. 7 is a diagram showing another example of a UFS system according to an example embodiment.

Referring to FIG. 7, the UFS system 1000 may include at least one bidirectional UFS lane.

According to various example embodiments, the UFS host 100 or the UFS device 200 may determine a transmitting direction of at least one bidirectional UFS lane 700. For example, when the size of downstream data is large, the UFS host 100 or the UFS device 200 may set the transmitting direction of the at least one UFS lane 700 as a downstream direction (e.g., a direction from the UFS host 100 toward the UFS device 200). For example, when the size of upstream data is large, the UFS host 100 or the UFS device 200 may set the transmitting direction of the at least one UFS lane 700 as an upstream direction (e.g., a direction from the UFS device 200 toward the UFS host 100). For example, when there is more than one bidirectional UFS lane 700, the transmitting direction of one or more of the bidirectional UFS lanes 700 may be set as the downstream direction while the transmitting direction of one or more other bidirectional UFS lanes 700 may be the upstream direction.

To implement at least one bidirectional UFS lane, the UFS host 100 and the UFS device 200 may each include a lane merging circuit and a lane distributing circuit.

According to various example embodiments, each UFS lane included in the at least one bidirectional UFS lane may include both the downstream interconnect module 300-1 and the upstream interconnect module 300-2. The UFS host 100 and the UFS device 200 may activate either the downstream interconnect module 300-1 or the upstream interconnect module 300-2 to match the transmitting direction of the at least one bidirectional UFS lane 700.

FIG. 8A is a table showing various examples of setting a receiving equalizer according to receiving channel quality according to an example embodiment.

Referring to FIG. 8A, a receiving UFS channel quality may have be categorized into categories 1 to 5 depending on a degree of signal distortion. For example, when a signal received through the receiving UFS channel is highly distorted, a channel quality may correspond to "1". When a degree of distortion of a signal received through the receiving UFS channel is good, the channel quality may correspond to "5". Here, a receiving UFS channel quality may be measured through a test process by performed by intellectual properties (IP) provided on a PCB.

According to various example embodiments, the CTLE 332 may at least one stage and the number of stages may correspond to a channel quality. For example, the channel quality may be measured in advance. For example, when the quality of a receiving UFS channel is good (Channel quality 5 or 4), the CTLE 332 may be implemented by a single stage. Because the degree of signal distortion is not severe, the CTLE 332 may be driven by low power and employ a simple structure by being implemented by a single stage. In another example, when the quality of a receiving UFS channel is poor (e.g., channel quality of 3 or 2), the CTLE 332 may be implemented by two multi-stages. The CTLE 332 may be implemented by cascading the two stages, thereby amplifying a high frequency component of a distorted signal and further reducing distortion of a low frequency component of the distorted signal. In another example, when the quality of a receiving UFS channel is very poor (e.g., channel quality of 1), the CTLE 332 may be implemented by three multi-stages.

According to various example embodiments, the DFE 334 may include at least one filter and the number of filters may correspond to the channel quality. For example, when the quality of a receiving UFS channel is good (Channel quality 5 or 4), the DFE 334 may be implemented by a single filter tap. However, as the quality of a receiving UFS channel is degraded, the number of filter taps that are driven may be increased to correct a distorted received signal. For example, one filter tap may be driven when the quality of a receiving UFS channel is poor (e.g., channel quality of 2). For example, two or three filter taps may be driven when the quality of a receiving UFS channel is very poor (e.g., channel quality of 1).

FIG. 8B is a table showing various examples of setting a transmitting equalizer according to transmitting channel quality according to an example embodiment.

Referring to FIG. 8B, a transmitting UFS channel quality may be categorized into categories 1 to 5 depending on a degree of signal distortion. For example, when a signal transmitted through the transmitting UFS channel is highly distorted, a channel quality may correspond to "1". When a degree of distortion of a signal transmitted through the transmitting UFS channel is good, the channel quality may correspond to "5". Here, the transmitting UFS channel quality may be measured through a test process performed by IPs provided on a PCB.

According to various example embodiments, the FFE 342 may differently set the intensity of a pre-emphasis according to a channel quality. As the channel quality is degraded, the FFE 342 may be controlled to simultaneously perform a pre-shoot (i.e., pre-cursor) as well as a de-emphasis (e.g., post-cursor).

For example, when the quality of the transmitting UFS channel is good (e.g., channel quality of 5), the FFE 342 may set the size of a post-cursor to −1.5 dB. In other words, the FFE 342 may only perform a de-emphasis. ISI may be suppressed by pre-emphasizing a transmitting signal by reducing the size of the remaining of a waveform other than the beginning of the waveform through the post-cursor. In the case of a section corresponding to the quality of the transmitting UFS channel quality degraded to 4, the FFE 342 may increase the size of the post-cursor to −3 dB. In other words, the FFE 342 may further reduce the remaining of the waveform as the quality of the transmitting UFS channel is degraded.

In another example, when the quality of the transmitting UFS channel is poor (e.g., channel quality of 3), the FFE 342 may perform both a de-emphasis and a pre-shoot. For example, the FFE 342 may set the size of a pre-cursor to −1.5 dB and the size of a post-cursor to −1.5 dB from among 3-tap FIR filter taps. Therefore, by pre-emphasizing a transmitting signal by reducing the size of the remaining of a waveform except the beginning and the end of the waveform, ISI may be suppressed. According to various example embodiments, when the channel quality is further degraded, pre-emphasis may be performed by increasing the sizes of the pre-cursor and post-cursor according to a degree of the degradation.

Figure 8C:
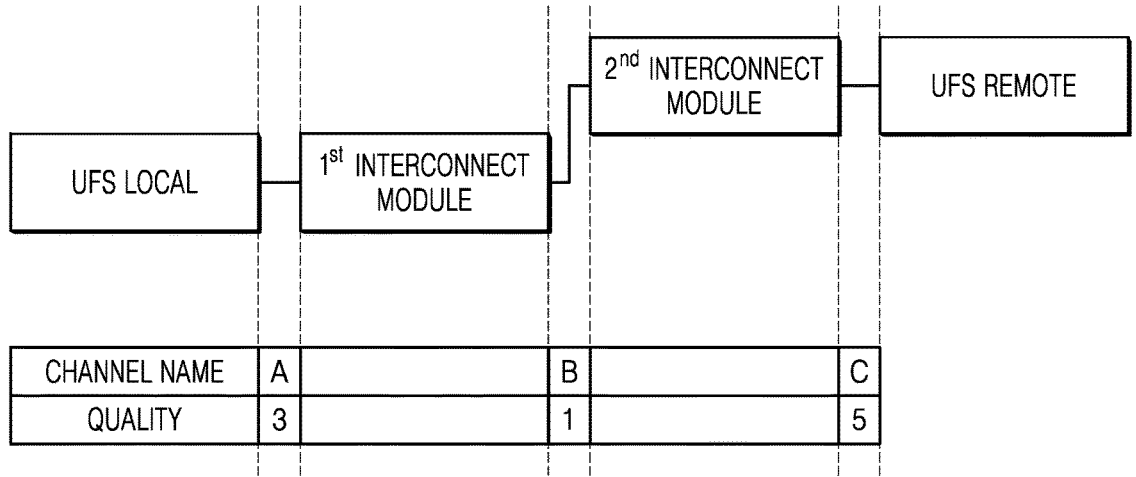
FIG. 8C is a diagram showing various examples of transmitting/receiving channel quality according to an example embodiment.

FIG. 8C is a diagram showing various examples of transmitting/receiving channel quality according to an example embodiment. FIG. 8C shows some regions of a PCB after arrangement of a plurality of IP blocks on the PCB is completed.

Referring to FIG. 8C, a UFS local and a UFS remote may be connected to each other through a UFS channel. According to an example embodiment, the UFS local and the UFS remote may be connected to each other through a first interconnect module and a second interconnect module.

According to various example embodiments, the connection between the UFS local and the UFS remote may be divided into three channels. For example, a channel A may refer to a connection between the UFS local and the first interconnect module, a channel B may refer to a connection between the first interconnect module and the second interconnect module, and a channel C may refer to a connection between the second interconnect module and the UFS remote.

According to an example embodiment, the connection of channel A between the UFS local and the first interconnect module may be formed in a straight line along a somewhat long distance (e.g., 10 cm). In this regard, the quality of the channel A may correspond to 3 because it may be assumed that the channel quality of the channel A is 3 when a straight connection between the UFS local and the first interconnect module is somewhat long (e.g., 10 cm).

The connection between the first interconnect module and the second interconnect module may be routed to prevent crosstalk with adjacent wiring, to avoid other IP blocks, or to optimize to a housing of an electronic device corresponding to a plurality of form factors. In this regard, the quality of the channel B may correspond to 1. When a connection is routed, such as the channel B, rather than a straight line connection, such as the channel A, parasitic capacitance may occur between lanes constituting the channel B, or parasitic capacitance may occur due to crosstalk with neighboring electrical lines. The parasitic capacitance may degrade the channel quality, and therefore the channel quality of the channel B may correspond to 1. On the other hand, the connection between the second interconnect module and the UFS remote may be a short connection formed along a straight line. Therefore, the quality of the channel C may correspond to 5. Unlike the channel B, because the channel C has a straight line connection between the second interconnect module and the UFS remote and is shorter than the channel length of the channel A, a degree of distortion of a transmitting signal may be good.

Hereinafter, for convenience of explanation, descriptions will be given under an assumption that signals are transmitted in a downstream direction from a UFS local to a UFS remote. Referring to FIGS. 8A to 8C, because the channel quality of the channel B is 1, a transmitting equalizer from among first interconnect modules may adjust the size of the pre-cursor and the size of the post-cursor of the FFE 342 to perform both a de-emphasis and a pre-shoot. A receiving equalizer from among second interconnect modules may be configured to purify a distorted signal by driving multiple stages of a CTLE and increasing the number of taps that are driven in a DFE.

Figure 9A:
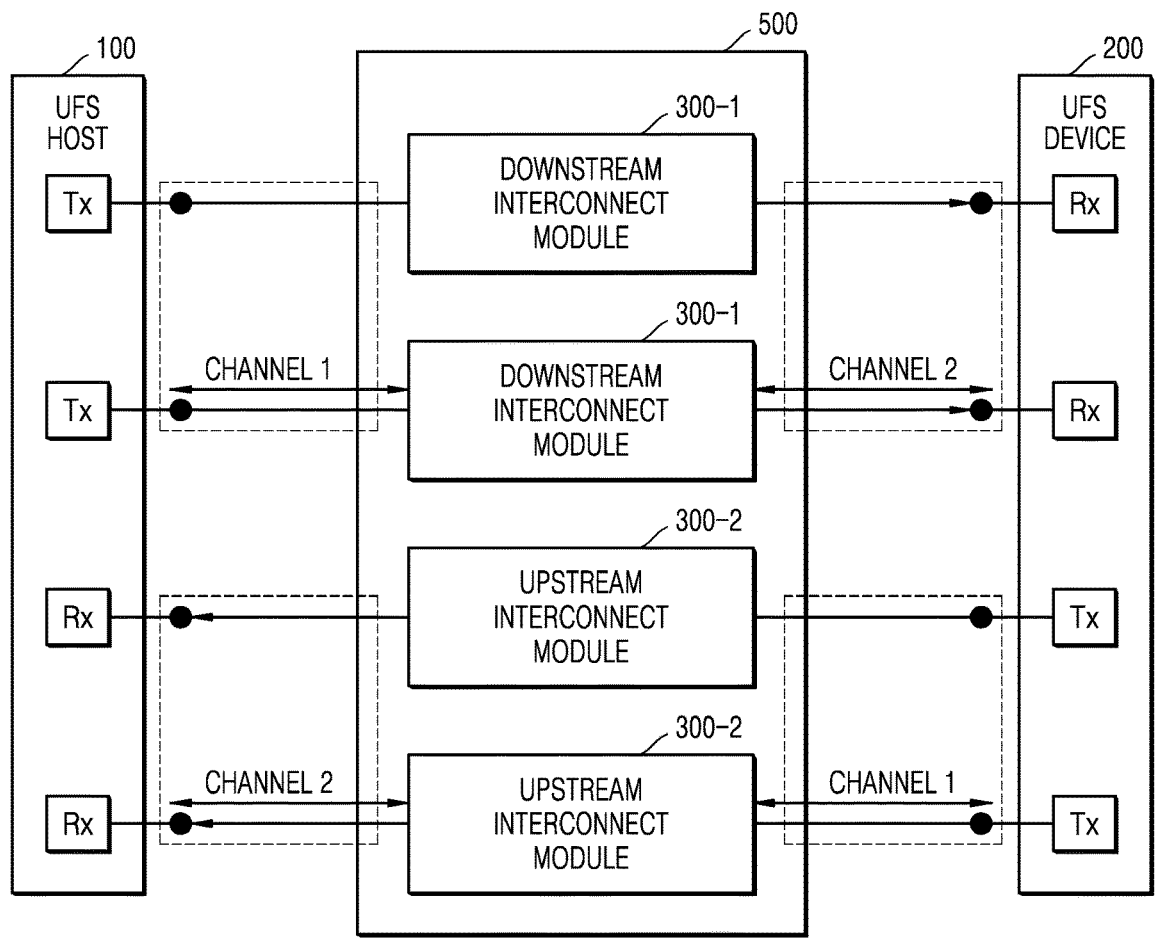
FIG. 9A is a diagram showing another example of a UFS system according to an example embodiment.
Figure 9B:
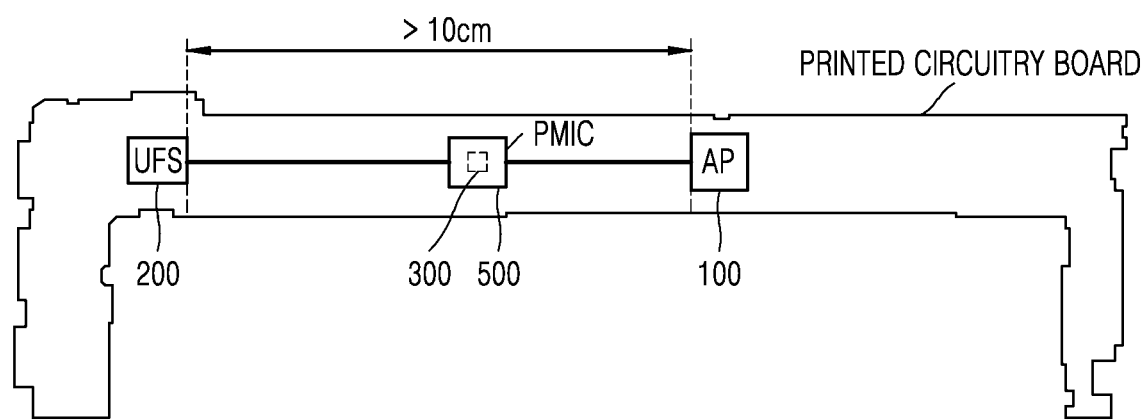
FIG. 9B is a diagram showing an implementation example of a UFS system according to an example embodiment.

FIGS. 9A and 9B are diagrams showing implementation examples of an interconnect module according to example embodiments.

Referring to FIG. 9A, a plurality of interconnect modules 300-1 and 300-2 may be mounted on or embedded in another IP block 500. According to various example embodiments, the IP block 500 may include at least a power management integrated circuit (PMIC) or a base band block.

Referring to FIG. 1 also, the interconnect modules 300-1 and 300-2 may be packaged together in various blocks including a power supplying device 1470, a communication device 1440, and a connecting interface 1480. When the interconnect modules 300-1 and 300-2 are routed to another IP block that also includes interconnect modules, the routing connection between a UFS local and a UFS remote may be provided via multiple IP blocks that include interconnect modules, and the overall routing connection may be longer than a direct connection. Further, PCB footprint may be reduced and the freedom of arrangement of the remaining IP blocks may be increased.

Figure 10:
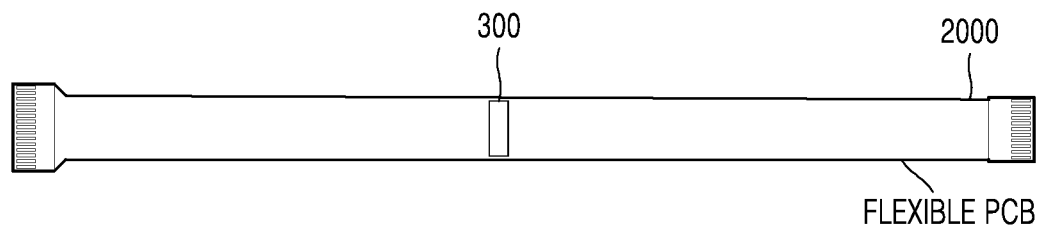
FIG. 10 is a diagram showing a flexible printed circuit board (FPCB) including an interconnect module according to an example embodiment.

FIG. 10 is a diagram showing a flexible printed circuit board circuit (FPCB) including an interconnect module according to an example embodiment.

Referring to FIG. 10, the interconnect module 300 may be included in an FPCB 2000.

According to various example embodiments, the FPCB 2000 may be implemented in the form of a cable. The UFS host 100 shown in FIG. 2 may be coupled to one end of the FPCB 2000, and the UFS device 200 shown in FIG. 2 may be coupled to the other end of the FPCB 2000. The FPCB 2000 may form a transmitting/receiving channel by electrically interconnecting the UFS host 100 and the UFS device 200.

Although it is shown that the FPCB 2000 includes one interconnect module 300, example embodiments are not limited thereto. In some example embodiments, at least two interconnect modules may be arranged according to the length of the FPCB 2000. For example, when the length of the FPCB 2000 implemented in the form of a cable is 30 cm, at least two interconnect modules may be arranged, and the limitation of the physical distance between the UFS host 100 and the UFS device may be overcome while maintaining the integrity of signals.

While example embodiments been particularly shown and described, it will be understood that various changes in form and details may be made therein without departing from the spirit and scope of the following claims.

What is claimed is:

1. An interconnect module device comprising:
   a line control command (LCC) detecting circuit configured to identify an LCC signal;
   an equalizer control circuit configured to generate a control signal based on the LCC signal;
   a receiving equalizer configured to perform receiving equalization on a first signal received from a first universal flash storage (UFS) device based on the control signal to generate a second signal; and
   a transmitting equalizer configured to perform transmitting equalization on the second signal to generate a third signal based on the control signal, and transmit the third signal to a second UFS device.

2. The interconnect module device of claim 1, wherein the LCC signal is successively received with the first signal from the first UFS device,
   wherein any one or any combination of an amplitude of the LCC signal and a pulse width of the LCC signal is different from those of the first signal, and
   wherein the LCC detecting circuit is configured to identify the LCC signal based on any one or any combination of the amplitude of the LCC signal and the pulse width of the LCC signal.

3. The interconnect module device of claim 2, wherein the LCC signal indicates a data transmission/reception rate between the first UFS device and the second UFS device.

4. The interconnect module device of claim 1, wherein the receiving equalizer comprises a continuous time linear equalizer (CTLE) and a decision feedback equalizer (DFE),
   wherein the CTLE and the DFE are cascaded with each other,
   wherein the CTLE comprises a high pass filter (HPF), and
   wherein the DFE comprises a finite impulse response (FIR) filter having at least one tap.

5. The interconnect module device of claim 4, wherein a number of CTLEs and a number of taps included in the DFE correspond to a channel quality measured in advance for an electrical connection between the first UFS device and the interconnect module device.

6. The interconnect module device of claim 1, wherein the transmitting equalizer comprises a feed forward equalizer (FFE) having at least one tap, and
   wherein the FFE is configured to perform pre-emphasis based on a coefficient of the at least one tap.

7. The interconnect module device of claim 6, wherein the coefficient of the at least one tap of the FFE corresponds to a channel quality measured in advance for an electrical connection between the interconnect module device and the second UFS device.

8. The interconnect module device of claim 1, wherein a physical distance between the first UFS device and the second UFS device exceeds 10 cm.

9. A universal flash storage (UFS) system comprising:
   a UFS host;
   a UFS device; and
   an interconnect module device configured to provide a downstream UFS lane and an upstream UFS lane interconnecting the UFS host and the UFS device,
   wherein the UFS host is configured to transmit a first signal and a line control command (LCC) signal to the UFS device through the downstream UFS lane,
   wherein the UFS device is configured to transmit a second signal and the LCC signal to the UFS host through the upstream UFS lane, and
   wherein a physical distance between the UFS host and the UFS device is equal to or greater than 10 cm.

10. The UFS system of claim 9, wherein the UFS host is configured to transmit the LCC signal together with the first signal,
    wherein the UFS device is configured to transmit the LCC signal together with the second signal,
    wherein the LCC signal indicates a power mode change and a data transmission/reception rate between the UFS host and the UFS device, and
    wherein the second signal indicates the power mode change is completed.

11. The UFS system of claim 10, wherein any one or any combination of an amplitude of the LCC signal and a pulse width of the LCC signal is different from those of the first signal and the second signal.

12. The UFS system of claim 9, wherein the interconnect module device comprises a first interconnect module device on the downstream UFS lane and a second interconnect module device on the upstream UFS lane.

13. The UFS system of claim 12, wherein the first interconnect module device and the second interconnect module device each comprise:
    an LCC detecting circuit configured to identify the LCC signal;
    an equalizer control circuit configured to generate a control signal based on the LCC signal;
    a receiving equalizer configured to perform equalization on a received signal based on the control signal; and
    a transmitting equalizer configured to perform equalization on a transmitting signal based on the control signal.

14. The UFS system of claim 13, wherein the receiving equalizer further comprises a continuous time linear equalizer (CTLE) and a decision feedback equalizer (DFE),
    wherein the CTLE and the DFE are cascaded with each other,
    wherein the CTLE comprises a filter having a high-frequency band pass transfer function, and
    wherein the DFE comprises a finite impulse response (FIR) filter having at least one tap.

15. The UFS system of claim 14, wherein the transmitting equalizer further comprises a feed forward equalizer (FFE) having at least one tap, and
    wherein the FFE is configured to perform de-emphasis according to a coefficient of the at least one tap.

16. The UFS system of claim 15, wherein the first interconnect module device is configured to identify a first power mode and a first data rate based on the LCC signal received together with the first signal from the UFS host, and control a first signal delay value of the first interconnect module device according to the first data rate, and
    wherein the second interconnect module device is configured to identify a second power mode and a second data rate based on the LCC signal received together with the second signal from the UFS device, and control a second signal delay value of the second interconnect module device according to the second data rate.

17. The UFS system of claim 16, wherein at least one tap coefficient of the FFE corresponds to a first quality of a transmitting channel measured in advance, wherein the transmitting channel comprises a first channel between the first interconnect module device and the UFS device or a second channel between the second interconnect module device and the UFS host, wherein a number of CTLEs and a number of taps included in the DFE correspond to a second quality of a receiving channel measured in advance, and wherein the receiving channel comprises a third channel between the UFS host and the first interconnect module device or a fourth channel between the UFS device and the second interconnect module device.

18. The UFS system of claim 10, wherein the first signal and the second signal correspond to a PACP_PWR_req signal and a PACP_PWR_cnf signal, respectively, wherein PACP_PWR_req signal instructs the power mode change and PACP_PWR_cnf signal indicates completion of the power mode change.

19. A method of operating a universal flash storage (UFS) system, which comprises a UFS host, a UFS device, a first UFS lane interconnecting the UFS host and the UFS device via a first interconnect module device, and a second UFS lane interconnecting the UFS host and the UFS device via a second interconnect module device, the method comprising:

transmitting, by the UFS host, a first signal indicating a change of a power mode and a line control command (LCC) signal to the first interconnect module device;

identifying, by the first interconnect module device, a first data rate based on the LCC signal and controlling a first signal delay value for at least one first equalizer included in the first interconnect module device according to the first data rate;

transmitting, by the UFS device, a second signal indicating completion of a power mode change according to the first signal and the LCC signal, to the second interconnect module device; and identifying, by the second interconnect module device, a second data rate based on the LCC signal and controlling a second signal delay value for at least one second equalizer included in the second interconnect module device according to the second data rate, wherein a length of an electrical connection between the UFS host and the UFS device is equal to or greater than 10 cm.

20. The method of claim 19, wherein the first signal corresponds to a PACP_PWR_req signal instructing the power mode change, wherein the second signal corresponds to a PACP_PWR_cnf signal indicating completion of the power mode change, and wherein the LCC signal further indicates the first data rate.

* * * * *